(12) United States Patent
Hu et al.

(10) Patent No.: US 11,852,929 B2
(45) Date of Patent: Dec. 26, 2023

(54) DIMMING GLASS WINDOW ASSEMBLY

(71) Applicants: Beijing BOE Sensor Technology Co., Ltd., Beijing (CN); BOE Technology Group Co., Ltd., Beijing (CN)

(72) Inventors: Zhong Hu, Beijing (CN); Chen Meng, Beijing (CN); Jiarong Liu, Beijing (CN); Yutao Tang, Beijing (CN); Yongbo Wang, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 86 days.

(21) Appl. No.: 17/770,838

(22) PCT Filed: Jun. 11, 2021

(86) PCT No.: PCT/CN2021/099728
§ 371 (c)(1),
(2) Date: Apr. 21, 2022

(87) PCT Pub. No.: WO2022/022109
PCT Pub. Date: Feb. 3, 2022

(65) Prior Publication Data
US 2022/0390780 A1 Dec. 8, 2022

(30) Foreign Application Priority Data
Jul. 27, 2020 (CN) .......................... 202010730187.6

(51) Int. Cl.
*B60J 3/04* (2006.01)
*G02F 1/1345* (2006.01)
*G02F 1/1333* (2006.01)
*G02F 1/1339* (2006.01)

(52) U.S. Cl.
CPC .......... *G02F 1/1345* (2013.01); *G02F 1/1339* (2013.01); *G02F 1/133305* (2013.01); *B60J 3/04* (2013.01)

(58) Field of Classification Search
CPC .......... B60J 3/04; G02F 1/1345; G02F 1/1339
USPC ....................................................... 349/149
See application file for complete search history.

(56) References Cited

U.S. PATENT DOCUMENTS

| 11,505,987 B2 * | 11/2022 | Mazuir | ............. G02F 1/133615 |
| 11,693,279 B1 * | 7/2023 | Lee | ..................... G02F 1/13725 |
| | | | 349/155 |
| 2022/0066254 A1 * | 3/2022 | Lee | ........................ G02F 1/1339 |

(Continued)

*Primary Examiner* — Christopher M Raabe
(74) *Attorney, Agent, or Firm* — IPro, PLLC (57) ABSTRACT

The present disclosure relates to a dimming glass window assembly, and the dimming glass window assembly includes a window frame, and a dimming glass located in the window frame, where the dimming glass includes a first glass layer and a second glass layer which are opposite to each other and spaced apart, a dimming function layer and a sealant layer which are arranged between the first glass layer and the second glass layer, the dimming function layer is located in a sealed space bound by the sealant layer, the first glass layer and the second glass layer. The dimming glass further includes a control line unit connected to an external dimming controller, the control line unit includes: a flexible printed circuit, a first circuit board, a second circuit board and a signal line.

15 Claims, 4 Drawing Sheets

(56) References Cited

U.S. PATENT DOCUMENTS

2022/0100021 A1* 3/2022 Yuan ..................... G02F 1/1339
2022/0347975 A1* 11/2022 Mannheim Astete .......................
B32B 17/10532

* cited by examiner

DIMMING GLASS WINDOW ASSEMBLY

CROSS REFERENCE TO RELATED APPLICATIONS

This application is the U.S. national phase of PCT Application PCT/CN2021/099728 filed on Jun. 11, 2021, which claims a priority of the Chinese Patent Application No. 202010730187.6 filed in China on Jul. 27, 2020, which is herein incorporated by reference in its entirety.

TECHNICAL FIELD

The present disclosure relates to the field of dimming glass technology, in particular to a dimming glass window assembly.

BACKGROUND

Electronically controlled dimming glass is a kind of film that can adjust the light transmittance based on TFT LCD process using dye liquid crystal material, which can be used to make laminated glass, insulating glass and other glass assemblies for car windows, building windows, curtain walls and other occasions.

Generally, only FPC (flexible printed circuit) is used in signal lines which control electronically controlled dimming glass, but the material of flexible printed circuit is thin, low strength and easy to be damaged. In order to solve this problem, the signal connected to the flexible printed circuit can be led by a shielded twisted pair wire, but a dimming function layer of the dimming glass is generally sealed in an inner glass layer by means of a sealant, the wire need to extend through the sealant to the outside, and the outer material of the wires has poor adhesion with the sealant, resulting in poor sealing.

SUMMARY

In order to address the above technical problem, the present disclosure provides a dimming glass window assembly that addresses the problems that the control line of the dimming glass is easily damaged and the sealing performance is poor.

In order to achieve the above object, technical solution in embodiments of the present disclosure is: a dimming glass window assembly, and the dimming glass window assembly includes: an window frame, a dimming glass located in the window frame, where the dimming glass includes a first glass layer and a second glass layer which are opposite to each other and spaced apart, a dimming function layer and a sealant layer which are arranged between the first glass layer and the second glass layer, where the dimming function layer is located in a sealed space bound by the sealant layer, the first glass layer and the second glass layer, and the dimming glass further includes a control line unit connected to an external dimming controller.

The control line unit includes: a flexible printed circuit, a first circuit board, a second circuit board and a signal line, where, one end of the flexible printed circuit is electrically connected to the dimming function layer, and another end of the flexible printed circuit passes through the sealant layer to electrically connect with the first circuit board; the first circuit board is electrically connected to the second circuit board; and the second circuit board is fixed on the window frame, the signal line is arranged on the window frame, one end of the signal line is connected to the second circuit board, and another end of the signal line is exposed to the window frame and is arranged with a plug to connect to the external dimming controller.

The flexible printed circuit is arranged in parallel with the first glass layer and is arranged at one end of the dimming function layer; the first circuit board is arranged perpendicularly to the first glass layer, and the first circuit board is arranged on one side of the flexible printed circuit away from the dimming function layer; and the second circuit board is arranged in parallel with the first circuit board, and the second circuit board is located on one side of the first circuit board away from the flexible printed circuit.

Optionally, the first circuit board includes a first connection surface and a second connection surface opposite to the first connection surface; the first connection surface is arranged with a flexible printed circuit connector for electrically connecting with one end of the flexible printed circuit away from the dimming function layer; the second connection surface is arranged with a bare metal region electrically connected to the flexible printed circuit connector, and the bare metal region forms a first connection part connected to the second circuit board.

Optionally, the first connection surface of the first circuit board is embedded within the sealant layer.

Optionally, the second circuit board includes a third connection surface and a fourth connection surface opposite to the third connection surface; the third connection surface is arranged with a second connection part connected to the first connection part; and the fourth connection surface is arranged with a third connection part electrically connected to the second connection part, and the third connection part is connected to the signal line.

Optionally, the second connection part is a metal elastic piece having one end fixed to the third connection surface.

Optionally, the third connection part includes a welding part welded to the second connection part through a through hole arranged on the second circuit board, the third connection part further includes a connecting point arranged at an end preset position of the fourth connection part, and a connecting trace arranged on the fourth connection surface for connecting the welding part and the connecting point, where the connecting point is used for connecting with the signal line.

Optionally, the dimming function layer includes a liquid crystal layer and two electrodes located on opposite sides of the liquid crystal layer; the flexible printed circuit includes a first flexible printed circuit and a second flexible printed circuit respectively connected to the two electrodes, and the flexible printed circuit connector includes two interfaces respectively electrically connected to the first flexible printed circuit and the second flexible printed circuit; two first connection parts are arranged on the second connection surface of the first circuit board; and two third connection parts and two second connection parts respectively corresponding to the two first connection parts are arranged on the second circuit board.

Optionally, the signal line is a shielded twisted pair wire.

Optionally, a side of the first glass layer, a side of the second glass layer, and the fourth connection surface of the second circuit board are on the same plane.

Optionally, a supporting frame is arranged between the first glass layer and the second glass layer, and the supporting frame is located within the sealed space.

Optionally, the sealed space is filled with inert gas.

Optionally, the first glass layer and the second glass layer are both composite glass, two adjacent layers of glass in the first glass layer are bounded to each other using PolyVinyl Butyral (PVB) film, and two adjacent layers of glass in the second glass layer are bounded to each other using the PVB film.

Optionally, a thickness of each layer of glass in the first glass layer is 4 mm, a thickness of each layer of glass in the second glass layer is 6 mm, and a thickness of the PVB film is 0.76 mm.

Optionally, material used for the sealant layer is butyl sealant.

The beneficial effect of the present disclosure is as follows, the signal of the flexible printed circuit connected to the dimming function layer is led out through the arrangement of the first circuit board and the second circuit board, the flexible printed circuit connected to the dimming function layer is sealed in the sealant layer, the second circuit board is fixed on the window frame, and the signal line is indirectly connected to the flexible printed circuit through the second circuit board, without passing through the sealant layer, avoiding the influence on the sealing performance.

DETAILED DESCRIPTION

In order to make the purpose, technical solutions and advantages of embodiments of the present disclosure clearer, the following clearly and completely describes the technical solutions in the embodiments of this disclosure with reference to the accompanying drawings in the embodiments of this disclosure. Apparently, the described embodiments are merely some rather than all of the embodiments of this disclosure. All other embodiments obtained by persons of ordinary skill in the art without creative efforts based on the embodiments of this disclosure shall fall within the protection scope of this disclosure.

In description the present disclosure, it should be noted that, the orientation or position relationships indicated by the terms "central", "upper", "lower", "left", "right", "vertical", "horizontal", "inner", "outer", and the like are based on the orientation or position relationships shown in the accompanying drawings and are merely for convenience in describing and simplifying the disclosure and do not indicate or imply that the referenced devices or elements must have a particular orientation, be constructed and operated in a particular orientation and, therefore, are not to be construed as limiting the disclosure. Furthermore, the terms "first", "second", and "third" are used for descriptive purposes only and are not to be construed as indicating or implying relative importance.

Dimming glass generally includes a glass body arranged opposite to each other and a dimming function layer sealed in the glass body by sealant. Generally, the control signal line of the dimming function layer is FPC (flexible printed circuit), the material is relatively thin and low strength; a dimming glass window assembly is generally used in vehicles or architectural senses, and there are many rigid mechanical structural components in usage environment, so that the flexible printed circuit is easily damaged. At the same time, due to the long distance between the dimming function layer and an installed position of an external dimming controller (generally greater than 50 cm), a length of the flexible printed circuit is too long, the production yield is low, the cost is high, and it is vulnerable to environmental signals.

In order to solve the above-mentioned problems, another solution is adopted in the related art: the flexible printed circuit is welded to a shielded twisted pair flexible wire and then lead out; however, the flexible wire has a large wire diameter, and polyethylene material on the outer layer of the wire has poor adhesion with sealant, so that the sealing performance fails to meet the requirements.

Figure 1:
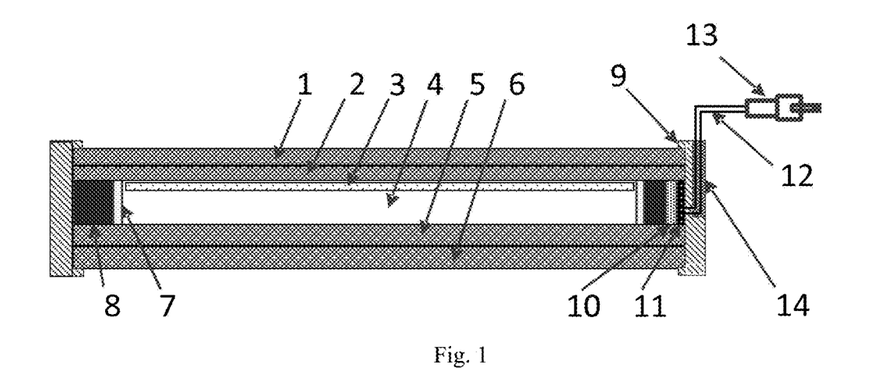
FIG. 1 is a structural diagram of a dimming glass window assembly in an embodiment of the present disclosure.

In order to address the above-mentioned technical problem, the present embodiment provides a dimming glass 100 window assembly, as shown in FIG. 1, the dimming glass window assembly includes a window frame 9, a dimming glass 100 located in the window frame 9, where the dimming glass 100 includes a first glass layer and a second glass layer which are opposite to each other and spaced apart, a dimming function layer 3 and a sealant layer 8 which are arranged between the first glass layer and the second glass layer, where the dimming function layer 3 is located in a sealed space 4 bound by the sealant layer 8, the first glass layer and the second glass layer. The dimming glass 100 further includes a control line unit connected to the external dimming controller.

The control line unit includes: a flexible printed circuit 15, a first circuit board 10, a second circuit board 11 and a signal line 12.

One end of the flexible printed circuit 15 is electrically connected to the dimming function layer 3, and another end of the flexible printed circuit 15 passes through the sealant layer 8 to electrically connect with the first circuit board 10.

The first circuit board 10 is electrically connected to the second circuit board 11.

The second circuit board 11 is fixed on the window frame 9, the signal line 12 is arranged on the window frame 9, one end of the signal line 12 is connected to the second circuit board 11, another end of the signal line 12 is exposed to the window frame 9, and is arranged with a plug 13 to connect to the external dimming controller.

Figure 8:
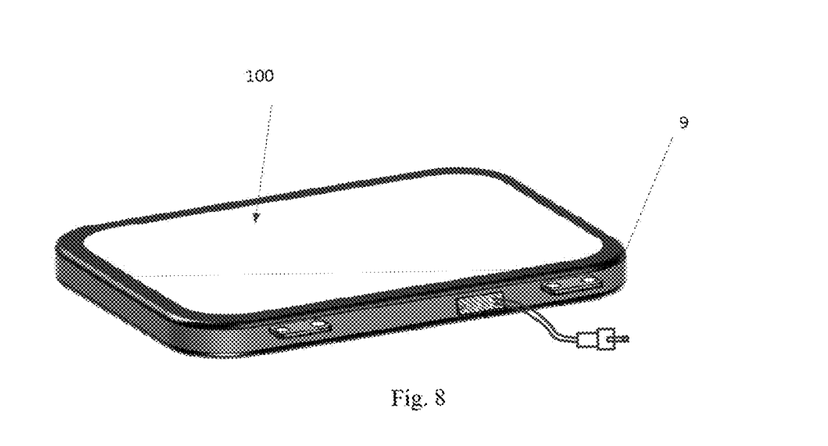
FIG. 8 is a schematic diagram of appearance of a dimming glass window assembly in an embodiment of the present disclosure.

The signal of the flexible printed circuit 15 connected to the dimming function layer 3 is led out through the arrangement of the first circuit board 10 and the second circuit board 11, and the flexible printed circuit 15 connected to the dimming function layer 3 is sealed in the sealant layer 8. FIG. 8 is a schematic diagram of appearance of a dimming glass 100 window assembly in this embodiment, only the part of the signal line 12 having a plug 13 is exposed to the dimming glass 100 window assembly, not the flexible printed circuit 15. The problem that the flexible printed circuit 15 is easily damaged due to exposure is avoided. The second circuit board 11 is fixed on the window frame 9, and the signal line 12 is indirectly connected to the flexible printed circuit 15 through the second circuit board 11, without passing through the sealant layer 8, thus avoiding the influence on the sealing performance.

Exemplified in the present embodiment, the flexible printed circuit 15 is arranged in parallel with the first glass layer and is arranged at one end of the dimming function layer 3. The first circuit board 10 is arranged perpendicularly to the first glass layer, and the first circuit board 10 is arranged on one side of the flexible printed circuit away from the dimming function layer 3. The second circuit board 11 is arranged in parallel with the first circuit board 10, and the second circuit board 11 is located on one side of the first circuit board 10 away from the flexible printed circuit 15.

The flexible printed circuit 15 and the first circuit board 10 are located in the dimming glass 100, the second circuit board 11 is fixed on the window frame 9, the dimming glass 100 and the window frame 9 are assembled to form a dimming glass 100 window assembly. As shown with reference to FIG. 1, the first circuit board 10 and the second circuit board 11 are both arranged perpendicularly to the first glass layer or the second glass layer, facilitating electrical connection of the first circuit board 10 and the second circuit board 11 when the dimming glass 100 and the window frame 9 are assembled.

Figure 2:
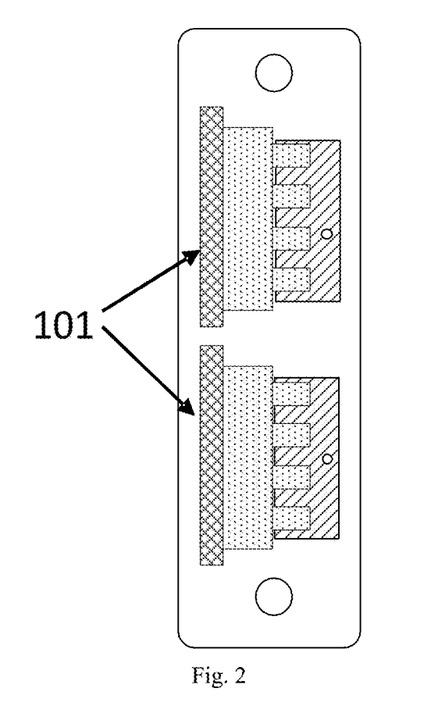
FIG. 2 is a schematic diagram of a first connection surface of a first circuit board in an embodiment of the present disclosure.
Figure 3:
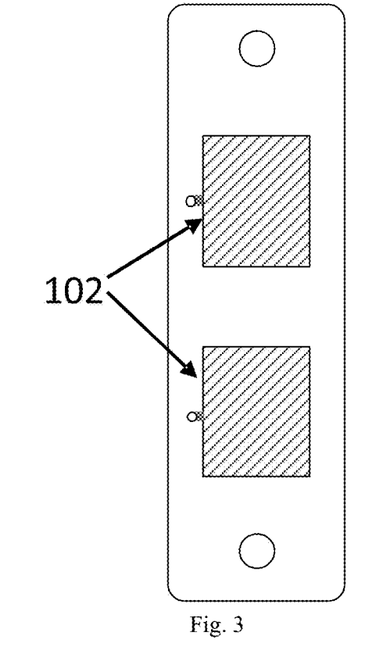
FIG. 3 is a schematic diagram of a second connection surface of a first circuit board in an embodiment of the present disclosure.
Figure 4:
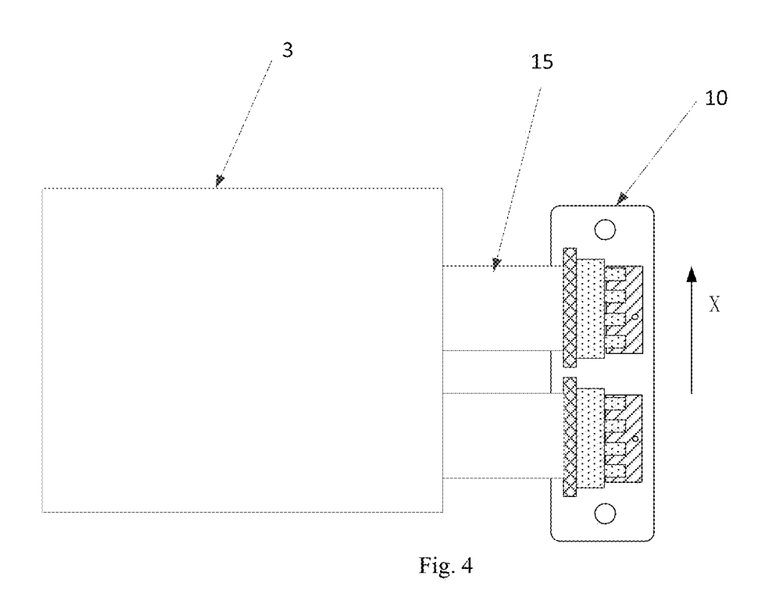
FIG. 4 is a schematic diagram showing a connection state of a flexible printed circuit and a first circuit board in an embodiment of the present disclosure.

Referring to FIG. 2 to FIG. 4, exemplified in the present embodiment, the first circuit board 10 includes a first connection surface and a second connection surface opposite to the first connection surface.

The first connection surface is arranged with a flexible printed circuit connector for electrically connecting with one end of the flexible printed circuit away from the dimming function layer, a first connecting terminal of the flexible printed circuit connector extends into a slot 101 to electrically connect with a connecting terminal of the flexible printed circuit 15 inserted into the slot 101, and a second connecting terminal of the flexible printed circuit connector is located on the first connection surface.

The second connection surface is arranged with a bare metal region electrically connected to the flexible printed circuit connector, and the bare metal region forms a first connection part 102 connected to the second circuit board 11.

The flexible printed circuit connector includes the slot 101 arranged on a side close to the flexible printed circuit 15, and a welding point arranged on a side away from the flexible printed circuit 15; the flexible printed circuit 15 is arranged parallel to the first glass layer or the second glass layer, the first circuit board 10 is arranged perpendicularly to the first glass layer or the second glass layer, the flexible printed circuit 15 is inserted into the slot 101 through the sealant layer 8 so as to electrically connect to the flexible printed circuit, ensuring stability of connection between the flexible printed circuit 15 and the first circuit board 10; and does not affect tightness of the dimming glass 100.

In the present embodiment, the width of the first flexible printed circuit in an extended direction of the first circuit board (referring to the X direction in FIG. 4) matches the length of the slot 101 in the extended direction of the first circuit board, and a connection position of the first flexible printed circuit and the slot 101 is connected in a centrosymmetric manner with the center point of the slot 101 in the extended direction of the first circuit board, ensuring connection stability of the first flexible printed circuit and the flexible printed circuit connector. The connection mode of the first flexible printed circuit and the flexible printed circuit connector is the same as the connection mode of the second flexible printed circuit and the flexible printed circuit connector, which will not be described in detail herein.

Exemplified in the present embodiment, the first connection surface of the first circuit board 10 is embedded within the sealant layer 8.

After the flexible printed circuit 15 is mounted and fixed on the dimming function layer 3, sealant between the first glass layer and the second glass layer is applied, and the flexible printed circuit 15 is connected to the first circuit board 10 before the sealant cures to form the sealant layer 8. Before the sealant cures, the hardness of the sealant is low, and the first circuit board 10 can be embedded in the sealant layer 8 by means of extrusion, etc. The first circuit board 10 is fixed by the sealant layer 8, and the first circuit board 10 is embedded in the sealant layer 8, so that the flexible printed circuit 15, the first circuit board 10 and the first connection surface connected to the flexible printed circuit 15 are completely sealed in the sealing space 4, effectively avoiding the damage of the flexible printed circuit 15 and ensuring the tightness of the dimming glass 100.

Figure 5:
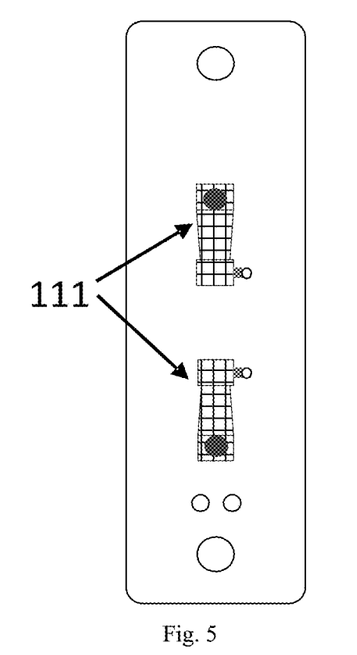
FIG. 5 is a schematic diagram of a third connection surface of a second circuit board in an embodiment of the present disclosure.
Figure 6:
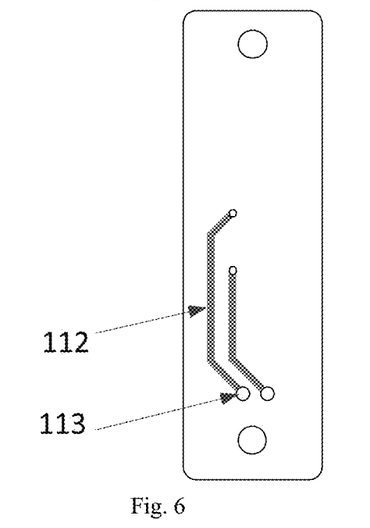
FIG. 6 is a schematic diagram of a fourth connection surface of a second circuit board in an embodiment of the present disclosure.
Figure 7:
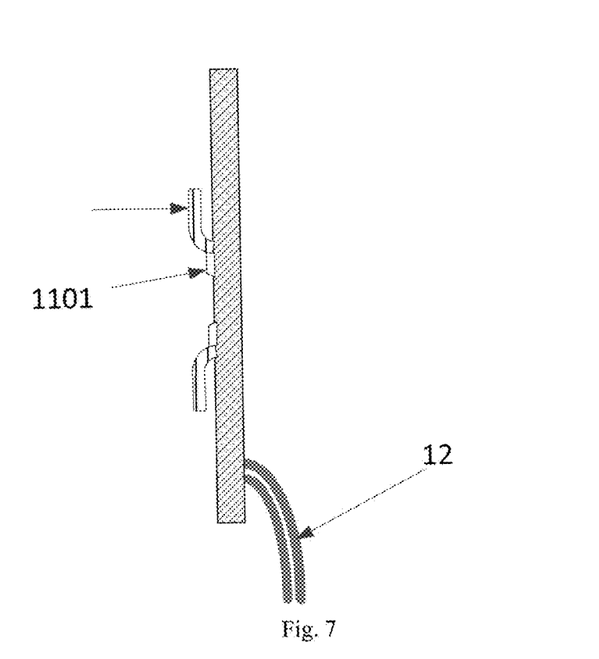
FIG. 7 is a schematic view of a side of a second circuit board in an embodiment of the present disclosure.

With reference to FIG. 5 to FIG. 7, exemplified in the present embodiment, the second circuit board 11 includes a third connection surface and a fourth connection surface opposite to the third connection surface.

The third connection surface is arranged with a second connection part 111 connected to the first connection part 102.

The fourth connection surface is arranged with a third connection part electrically connected to the second connection part 111, and the third connection part is connected to the signal line 12.

A preset position of the third connection surface of the second circuit board 11 is arranged with the second connection part 111. When the dimming glass 100 is assembled with the window frame 9, the second connection surface of the first circuit board 10 is arranged facing the third connection surface of the second circuit board 11, and the first connection part 102 contacts the second connection part 111 to form a pathway.

Exemplified in the present embodiment, the second connection part 111 is a metal elastic piece having one end fixed to the third connection surface.

With reference to FIG. 5 and FIG. 7, one end of the metal elastic piece has a fixing part 1101 fixed on the second circuit board 11, and another end of the metal elastic piece extends in a direction away from the second circuit board 11 and is reversely bent, to form an elastic portion 1102 arranged in parallel with the third connection surface of the second circuit board 11. There is elastic space between the elastic portion 1102 and the third connection surface, so that the metal elastic piece can be elastically contacted with the first connection part 102, avoid the occurrence of a situation where the first connection part 102 and the second connection part 111 cannot make contact to allow a break between the first circuit board 10 and the second circuit board 11 due to installation space restrictions.

The second connection part 111 is not limited to the above, and the second connection part 111 may have other structural forms as long as an electrical connection between the first circuit board 10 and the second circuit board 11 can be achieved.

Referring to FIG. 6, exemplified in the present embodiment, the third connection part includes a welding part welded to the second connection part 111 through a through hole arranged on the second circuit board 11, the third connection part further includes a connecting point 113 arranged at an end preset position of the fourth connection part, and a connecting trace 112 arranged on the fourth connection surface for connecting the welding part and the connecting point 113, where the connecting point 113 is used for connecting with the signal line 12.

The connecting trace 112 is arranged such that the connecting point 113 connected to the signal line 12 is located at an end of the second circuit board 11, so as to facilitate the lead-out of the signal line 12. When the number of the signal lines 12 is greater than 1, the connecting point 113 connected to the signal line 12 is moved to the same region through the arrangement of the connecting trace 112, so as to facilitate wiring harness management.

Exemplified in the present embodiment, the dimming function layer 3 includes a liquid crystal layer and two electrodes located on opposite sides of the liquid crystal layer.

The flexible printed circuit 15 includes a first flexible printed circuit and a second flexible printed circuit which are respectively connected to the two electrodes, and the flexible printed circuit connector includes two interfaces respectively electrically connected to the first flexible printed circuit and the second flexible printed circuit, and two flexible printed circuit connectors which are respectively electrically connected to the first flexible printed circuit and the second flexible printed circuit may also be arranged; two first connection parts 102 are arranged on the second connection surface of the first circuit board 10; and two third connection parts and two second connection parts 111 respectively corresponding to the two first connection parts 102 are arranged on the second circuit board 11.

With reference to FIG. 7, two connection terminals of the flexible printed circuit 15 are respectively inserted into corresponding slots 101 on the first circuit board 10, and two first connection part 102 are arranged on corresponding the first circuit board 10; two second connection part 111 and two third connection part are arranged on the second circuit board 11; of course, two signal line 12 are also arranged. At this moment, two connecting traces 112 on the fourth connection surface of the second circuit board 11 are also arranged; the connecting point 113 respectively connected to the two signal lines 12 are led out to the same region (it is shown in FIG. 6 that the two connecting points 113 are arranged side by side) so as to facilitate the connection of the signal lines 12 and facilitate wiring harness management.

Exemplified in the present embodiment, the signal line 12 is a shielded twisted pair wire.

The outer layer of the shielded twisted pair wire is arranged with a shielding layer (formed of, but not limited to, polyethylene material) that reduces attenuation and noise by means of shielding, thereby providing cleaner electronic signals and a longer cable length.

In the present embodiment, a wire groove 14 is arranged on the window frame 9, the signal line 12 passes through the wire groove 14 and is exposed at the wire groove 14, and the signal line 12 is not pressed in the case where the window frame 9 is closely fitted with other mounting surfaces, such as a wall body, so as to protect the signal line 12.

Exemplified in the present embodiment, the side of the first glass layer, the side of the second glass layer, and the fourth connection surface of the second circuit board 11 are on the same plane.

The window frame 9 is arranged with a mounting groove for mounting and fixing the dimming glass 100, the side of the first glass layer and the side of the second glass layer are located on the same plane. After the dimming glass 100 is assembled with the window frame 9, the side of the first glass layer, the side of the second glass layer, and the fourth connection surface of the second circuit board 11 are on the same plane, so that there is a close fit between the dimming glass 100 and the window frame 9, the stability of the connection between the dimming glass 100 and the window frame 9 and aesthetic appearance are ensured.

Exemplified in the present embodiment, a supporting frame 7 is arranged between the first glass layer and the second glass layer, the supporting frame 7 is located within the sealed space 4.

The supporting frame 7 is annular, the arrangement of the supporting frame 7 ensures distance between the first glass layer and the second glass layer, the distance between the first glass layer and the second glass layer defines a size of the sealing space 4, and the size of the sealing space 4 varies so as to form different soundproof and thermal insulation effects.

Exemplified in the present embodiment, the sealed space 4 is filled with inert gas. The inert gas further enhances the soundproof and thermal insulation effects of the dimming glass 100 window assembly.

Exemplified in the present embodiment, the first glass layer and the second glass layer are both composite glass, two adjacent layers of glass in the first glass layer are bounded to each other using PVB film, and two adjacent layers of glass in the second glass layer are bounded to each other using the PVB film.

Referring to FIG. 1, the first glass layer includes a first glass 1 and a second glass 2, where the second glass layer includes a third glass 5 and a fourth glass 6.

The number of glass included in the first glass layer and the second glass layer can both be set according to actual needs.

In the present embodiment, the glass forming the first glass layer and the glass forming the second glass layer are both made of tempered glass, but not limited thereto.

Exemplified in the present embodiment, a thickness of each layer of glass in the first glass layer is 4 mm, a thickness of each layer of glass in the second glass layer is 6 mm, and a thicknesses of the PVB film is 0.76 mm.

Exemplified in the present embodiment, the thickness of the dimming function layer 3 is 0.8 mm, the dimming function layer 3 is connected to the first glass layer via a PVB film, and the thickness of the PVB film is 0.76 mm.

It should be noted that, the number of the glass forming the first glass layer and the second glass layer may be set according to actual needs, and the settings of the thickness of the glass in the first glass layer, the thickness of the glass in the second glass layer, the thickness of the PVB film, and the thickness of the dimming function layer 3 are not limited to the above.

Exemplified in the present embodiment, the material used for the sealant layer 8 is butyl sealant.

Exemplified in the present embodiment, a method of manufacturing the dimming glass 100 window assembly is as follows.

1. Fabricating the first glass layer and the second glass layer

Two tempered glasses with a thickness of 4 mm are bonded together using an PVB film with a thickness of 0.76 mm to form the first glass layer, the dimming function layer 3 with a thickness of 0.8 mm is bonded and fixed to the first glass layer using the PVB film with a thickness of 0.76 mm, it is put into an autoclave after pre-pressing by rolling, and formed by performing high-temperature and high-pressure.

Two tempered glasses with a thickness of 6 mm are bonded using a PVB film with a thickness of 0.76 mm, pre-pressed by rolling, and then placed in an autoclave, and subjected to high temperature and high pressure to form the second glass layer.

2. Fabricating the first circuit board 10

2 pcs FPC connectors (flexible printed circuit connector) are placed on the first connection surface of the first circuit board 10 for respectively connecting two FPC electrodes (namely, the first flexible printed circuit and the second flexible printed circuit) connected to the dimming function layer 3 onto the first circuit board 10. The second connection surface of the first circuit board 10 has two large-area bare metal regions (the metal region is a copper region in the present embodiment) as an external interface for electrical signals, and the two bare metal regions are respectively connected to two FPC connector pads (namely, the second connection terminals) of the first connection surface so as to electrical conduction.

3. Fabricating the second circuit board 11.

Two metal elastic pieces (the metal elastic piece is made of copper in the present embodiment) are welded on the third connection surface of the second circuit board 11 as contact points for electrical connection with the first circuit board 10; the two metal elastic pieces are respectively connected to two through hole pads (namely, the connecting points 113 on the fourth connection surface) on the second circuit board 11; a signal line 12 is welded to the through hole pad; and another end of the signal line 12 forms a wire-to-wire connector socket as an extraction electrode.

4. Fabricating the dimming glass 100.

The first glass layer and the second glass layer are supported by the supporting frame 7 (the supporting frame 7 is made of aluminum in the present embodiment, but not limited thereto), and a flexible printed circuit 15 connected to the dimming function layer 3 is connected to the first circuit board 10 through the supporting frame 7, and butyl sealant (namely, butyl glue) is applied to an outer ring of the supporting frame 7, bonding the first glass layer and the second glass layer, and forming the sealant layer 8. At the same time, inert gas is filled in the sealed space 4 bound by the first glass layer, the second glass layer and the sealant layer 8. When the butyl sealant is applied to the outermost layer, the first circuit board 10 is adjusted so that the distance between the second connection surface of the first circuit board 10 and the side of the first glass layer in a first direction (the direction parallel to the first glass layer) is a preset distance, the fourth connection surface of the second circuit board 11, the side of the first glass layer and the side of the second glass layer are on the same plane after the first circuit board 10 and the second circuit board 11 are connected.

5. Fabricating a dimming glass window assembly

The second circuit board 11 is fixed on the window frame 9 by screws (the window frame 9 is made of aluminum, but not limited thereto), and the dimming glass 100 obtained in step 4 is placed into the window frame 9, to make the first connection part 102 of the second connection surface of the first circuit board 10 in contact with a metal elastic piece on the third connection surface of the second circuit board 11, the dimming glass 100 and the window frame 9 are fixed using a structural glue applied at the joint of the dimming glass 100 and the window frame 9.

The foregoing are directed to preferred embodiments of the present disclosure. It should be noted that, for a person of ordinary skill in the art, improvements and embellishments can be made without departing from the above principles, and these improvements and embellishments should also be regarded as the scope of protection of the present disclosure.

What is claimed is:

1. A dimming glass window assembly, comprising:
    a window frame, and
    a dimming glass located in the window frame, wherein
    the dimming glass comprises: a first glass layer and a second glass layer which are opposite to each other and spaced apart, a dimming function layer and a sealant layer which are arranged between the first glass layer and the second glass layer, wherein the dimming function layer is located in a sealed space bound by the sealant layer, the first glass layer and the second glass layer, and
    the dimming glass further comprises a control line unit connected to an external dimming controller, wherein
    the control line unit comprises: a flexible printed circuit, a first circuit board, a second circuit board and a signal line, wherein,
    one end of the flexible printed circuit is electrically connected to the dimming function layer, and another end of the flexible printed circuit passes through the sealant layer to electrically connect with the first circuit board;
    the first circuit board is electrically connected to the second circuit board; and
    the second circuit board is fixed on the window frame, the signal line is arranged on the window frame, one end of the signal line is connected to the second circuit board, and another end of the signal line is exposed to the window frame and is arranged with a plug to connect to the external dimming controller.

2. The dimming glass window assembly of claim 1, wherein,
    the flexible printed circuit is arranged in parallel with the first glass layer and is arranged at one end of the dimming function layer;
    the first circuit board is arranged perpendicularly to the first glass layer, and the first circuit board is arranged on one side of the flexible printed circuit away from the dimming function layer; and
    the second circuit board is arranged in parallel with the first circuit board, and the second circuit board is located on one side of the first circuit board away from the flexible printed circuit.

3. The dimming glass window assembly of claim 2, wherein the first circuit board comprises a first connection surface and a second connection surface opposite to the first connection surface;
    the first connection surface is arranged with a flexible printed circuit connector for connecting with one end of the flexible printed circuit away from the dimming function layer; and
    the second connection surface is arranged with a bare metal region electrically connected to the flexible printed circuit connector, and the bare metal region forms a first connection part connected to the second circuit board.

4. The dimming glass window assembly of claim 3, wherein the first connection surface of the first circuit board is embedded within the sealant layer.

5. The dimming glass window assembly of claim 3, wherein the second circuit board comprises a third connection surface and a fourth connection surface opposite to the third connection surface;

the third connection surface is arranged with a second connection part connected to the first connection part; and the fourth connection surface is arranged with a third connection part electrically connected to the second connection part, and the third connection part is connected to the signal line.

6. The dimming glass window assembly of claim 5, wherein the second connection part is a metal elastic piece having one end fixed to the third connection surface.

7. The dimming glass window assembly of claim 5, wherein the third connection part comprises a welding part welded to the second connection part through a through hole arranged on the second circuit board, the third connection part further comprises a connecting point arranged at an end preset position of the fourth connection part, and a connecting trace arranged on the fourth connection surface for connecting the welding part and the connecting point, wherein the connecting point is used for connecting with the signal line.

8. The dimming glass window assembly of claim 5, wherein the dimming function layer comprises a liquid crystal layer and two electrodes located on opposite sides of the liquid crystal layer;

the flexible printed circuit comprises a first flexible printed circuit and a second flexible printed circuit respectively connected to the two electrodes, and the flexible printed circuit connector comprises two interfaces respectively electrically connected to the first flexible printed circuit and the second flexible printed circuit;

two first connection parts are arranged on the second connection surface of the first circuit board; and two third connection parts and two second connection parts respectively corresponding to the two first connection parts are arranged on the second circuit board.

9. The dimming glass window assembly of claim 1, wherein the signal line is a shield twisted pair wire.

10. The dimming glass window assembly of claim 1, wherein a side of the first glass layer, a side of the second glass layer, and the fourth connection surface of the second circuit board are on the same plane.

11. The dimming glass window assembly of claim 1, wherein a supporting frame is arranged between the first glass layer and the second glass layer, and the supporting frame is located within the sealed space.

12. The dimming glass window assembly of claim 1, wherein the sealed space is filled with inert gas.

13. The dimming glass window assembly of claim 1, wherein the first glass layer and the second glass layer are both composite glass, two adjacent layers of glass in the first glass layer are bounded to each other using PolyVinyl Butyral (PVB) film, and two adjacent layers of glass in the second glass layer are bounded to each other using the PVB film.

14. The dimming glass window assembly of claim 13, wherein a thickness of each layer of glass in the first glass layer is 4 mm, a thickness of each layer of glass in the second glass layer is 6 mm, and a thickness of the PVB film is 0.76 mm.

15. The dimming glass window assembly of claim 1, wherein material used for the sealant layer is butyl sealant.

* * * * *